Jan. 15, 1963 R. S. ROWE 3,073,156
METHOD FOR ESTABLISHING, DETERMINING AND CHECKING TENSION
IN GUY WIRES, SUSPENSION CABLES AND THE LIKE
Filed Feb. 29, 1960 3 Sheets-Sheet 1

INVENTOR.
Robert S. Rowe
BY
B. B. Olive
ATTORNEY

Jan. 15, 1963 R. S. ROWE 3,073,156
METHOD FOR ESTABLISHING, DETERMINING AND CHECKING TENSION
IN GUY WIRES, SUSPENSION CABLES AND THE LIKE
Filed Feb. 29, 1960 3 Sheets-Sheet 2
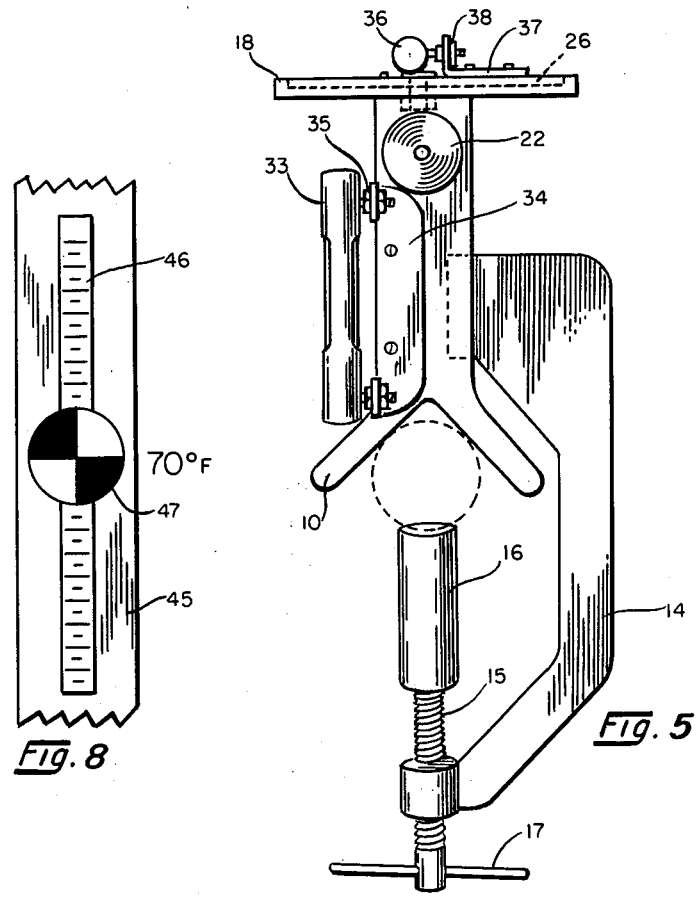
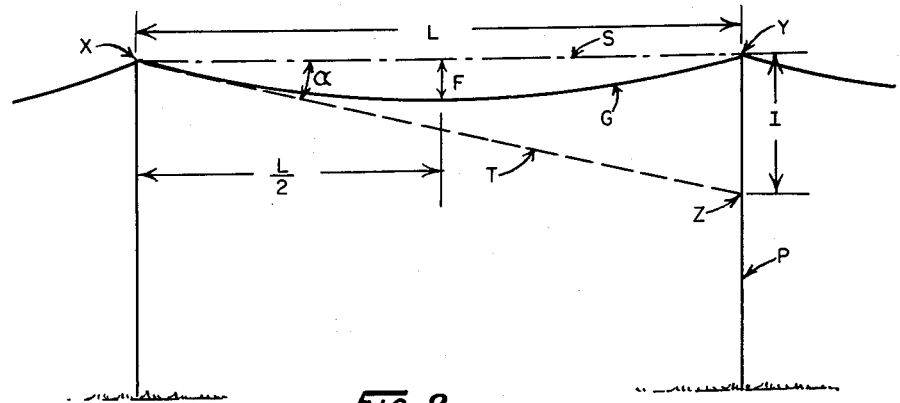
INVENTOR.
Robert S. Rowe
BY
ATTORNEY

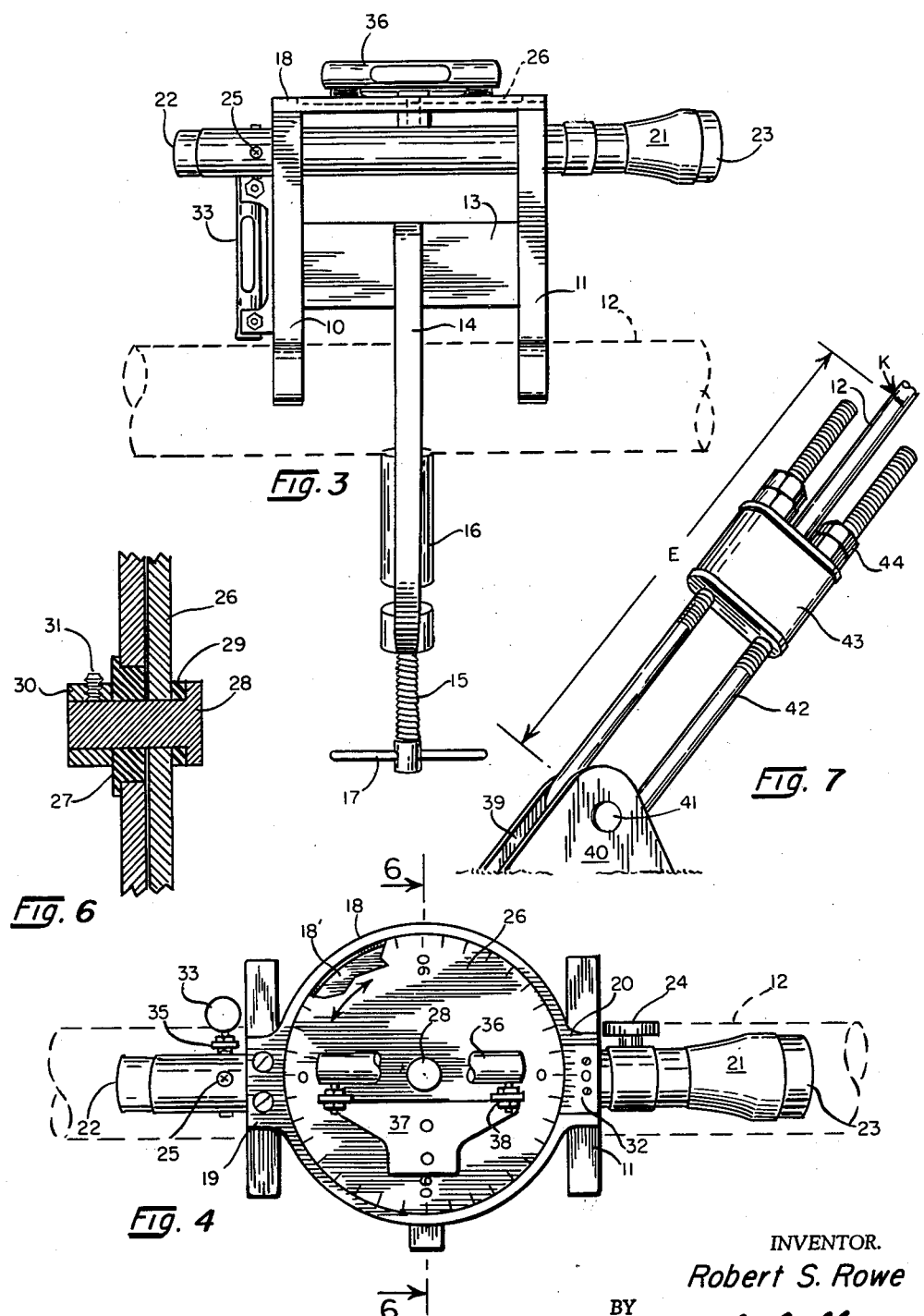

3,073,156
METHOD FOR ESTABLISHING, DETERMINING AND CHECKING TENSION IN GUY WIRES, SUSPENSION CABLES AND THE LIKE
Robert S. Rowe, Durham, N.C.
(4914 Roselawn Circle, Nashville, Tenn.)
Filed Feb. 29, 1960, Ser. No. 11,728
3 Claims. (Cl. 73—143)

This invention relates to a method for establishing, determining and checking the tension present in flexible curved cable members supporting or suspended between structures, as in guyed towers, guyed stacks, suspension bridges, electric power transmission lines and the like. The invention is particularly related to a method for establishing, determining and checking the tension in guy supported broadcasting towers.

In the art of erecting and maintaining guyed broadcasting towers, it is vitally important to the stability of the tower that proper tension be established and maintained in each of the supporting cables, commonly referred to as guy wires. Thus, during erection it is necessary to establish proper tension in each guy wire as it is drawn into place and, after erection, it is advisable periodically to recheck tension in each guy, particularly after earth tremors, storms and the like. Where the tension is correct, this fact should be known and, if not correct, the actual tension should be determined in order to make necessary corrections. The importance of the problem is recognized in the fact that guyed towers in excess of 1500 feet high have already been installed and theoretical designs up to one mile in height have been projected. Erection personnel whose safety depends on correct guy tension, owners of towers, field engineers and government inspectors have indicated a need for a simple and accurate apparatus and method for initially determining and periodically checking guy tension.

Prior art methods and apparatus have made guy tensioning one of the most tedious and time-consuming tasks in tower erection as well as in proper tower maintenance. The prior art has included the so-called hydraulic jack, the sonic method, the tangent measuring device, the invar rule and the transit method. The hydraulic jack in operation is attached between the guy ground anchor and the guy so as to take up the tensile load of the guy by means of hydraulic pressure, the pressure required being an indication of tension in the guy. The sonic method operates on the principle of establishing a traveling wave in the guy and measuring the time required for the wave to travel from the guy ground anchor to the tower and back, this time being related to tension. The tangent measuring device consists of two bars which are fastened to the guy wire at the base so as to form a right triangle, the vertical and horizontal legs of which are formed by the bars and the hypotenuse of which is formed by a section of the guy wire, the vertical angle of the guy being determinable from the triangle and being related to tension. In the invar rule system, the cables are pre-stressed in the shop and lugs are attached to the cable at a customary distance apart of 100 inches so that, at correct tensioning, the scribe marks will agree with related marks on an invar rule. The transit method involves locating a transit in line with the guy but in front of the anchor with the transit at a predetermined vertical angle. The guy is then drawn in place until it can be seen in the transit.

The prior art methods and apparatus are expensive in initial cost and universally lack self-checking features wherein the accuracy of the measuring instrument itself can be easily determined and calibrated in the field and, equally important, wherein the tension is determinable on the site, substantially simultaneously, by at least two different methods, the results of which can be immediately compared at the site under the same weather conditions so as to indicate inaccuracies either in the apparatus or the methods being used. The hydraulic jack method in particular involves the risk of slippage during installation, since it carries the entire guy load while tension is being measured. The hydraulic jack also inherently prevents adjustment of guy tension while tension is being measured and, because of the difficulty of field calibration and repair, involves loss of time when calibration or adjustment is required. Other operating problems such as dial insensivity are frequently encountered. The sonic method is limited to measuring tension in certain lengths of cable and also depends on various assumptions, such as uniformity of cable, which lead to error. The tangent measuring device suffers the disadvantage of requiring the leveling, attachment and precise measuring of several separate components. Invar rule lugs are subject to slippage. The transit method is conditioned on suitable topography, requires considerable precomputation and is generally time consuming. None of the apparatus and methods, as previously mentioned, is completely self checking and none is easily adaptable to measuring many separate guy tensions simultaneously.

The object of my invention is to provide a relatively inexpensive and easily applied method for quickly and safely establishing, determining and checking the tension in guy wires and the like.

A particular object is to provide a method for establishing, determining and checking tension in guy wires and the like in which the tension is determinable by two different sets of measurements which may be taken substantially simultaneously and compared for results.

Another object is to provide a method for checking tension in guy wires and the like in which the accuracy of the tension measuring apparatus can be determined and necessary adjustments made in the field to overcome any inaccuracy.

Another object is to provide a method for determining and checking tension in guy wires and the like which allows adjustment of guy tension to proceed without interruption caused by such method and apparatus.

Another object is to provide a method for determining and checking tension in guy wires and the like which does not require that the apparatus employed assume the tensile load for purposes of measurement.

Another object is to provide a method for determining and checking tension in guy wires and the like which is capable of determining and checking tension in a variety of lengths and sizes.

Another object is to provide a method for determining and checking tension in guy wires and the like in which the apparatus used may comprise a unitary structure that is easily attached and removed from the guy wire for purposes of taking measurements.

Another object is to provide a method for determining and checking tension in guy wires and the like which makes it practical to apply the method and apparatus employed to a number of guy wires simultaneously, thus saving the time required to move the apparatus and crew from one guy to another.

Other objects will appear as the description proceeds.

With these objects in view, the apparatus employed consists generally in a frame having a pair of longitudinally aligned and laterally spaced bearing surfaces capable of being clamped to a relatively short, substantially straight section of guy wire. The frame carries a precision sighting instrument having its optical axis located immediately adjacent and aligned parallel with the axis of the section of guy wire included between the bearing surfaces of the frame. The sighting instrument allows the operator to sight towards the point on the tower intercepted by the line tangent to the guy wire at the base, this point being referred to as the tangent intercept and the line as the tangent intercept line. The frame also carries means for measuring the vertical angle of the tangent intercept line. Since the tangent intercept and the vertical angle of the tangent intercept line can both be shown to be related to guy wire tension, the invention provides in a single measuring structure two separate and substantially simultaneously applied means of determining guy wire tension. Through various leveling and adjustment means hereafter described, the invention also provides means for accurately positioning and checking the accuracy of both the sighting instrument and the vertical angle measuring means. In operative association with the aforesaid is an accurately positioned sighting target located on the tower and having graduations which are visible through the sighting instrument.

The invention consists in a method for determining and checking guy wire tension wherein a relatively short, substantially straight section of the guy wire at one of its points of support, normally the base in the case of a broadcasting tower, is used to carry both a precision sighting instrument having an optical axis immediately adjacent and parallel to the cable section and a tangent intercept line vertical angle precision measuring device; the structure supporting the guy wire at its other point of support, normally some elevated point on the tower in the case of a broadcasting tower, being used to carry a vertically graduated and accurately placed target which can be sighted by the instrument, whereby the target reading and the angle measured by the device, taken at what is effectively the same time and under the same conditions, give two separate indications of the guy wire tension that may be compared one against the other.

The invention further consists in various other aspects of method as will be hereafter described and pointed out in the claims.

Referring now particularly to the drawings, forming a part of the specification and in which FIGURE 1 is a somewhat schematic diagram indicating the tangent intercept line, the vertical angle and other dimensions related particularly to the theoretical background as applied to a broadcasting tower situation.

FIGURE 2 is a schematic diagram similar to FIGURE 1 and showing the relevant dimensions in a transmission line situation.

FIGURE 3 is a plan view of the apparatus as it appears clamped against a section of guy wire, indicated in dotted lines.

FIGURE 4 is a top elevation view of FIGURE 3 looking towards the vertical angle measuring means.

FIGURE 5 is an end elevation view of FIGURE 3 looking towards the eyepiece of the sighting instrument.

FIGURE 6 is a detail partial cross section taken along line 6—6 of FIGURE 4 showing how the vertical angle disc is mounted.

FIGURE 7 is a perspective, somewhat schematic view of a typical method of anchoring a broadcasting tower guy wire.

FIGURE 8 is a schematic representation of the target on which the apparatus is sighted.

As heretofore stated, the apparatus employed comprises generally a precision made frame adapted to being secured to a relatively short, substantially straight section of guy wire as, for example, at the base of a guy supported broadcasting tower. The frame carries a precision sighting instrument whose optical axis lies parallel to the axis of the guy wire section such that the point on the tower intercepted by the line tangent to the guy at the base can be seen through the instrument. The frame also carries precision means for accurately measuring the vertical angle of this tangent intercept line. Separately located on the tower itself is an accurately placed graduated target allowing the referred-to point to be determined. In order better to understand the apparatus, reference is first made to FIGS. 1 and 2, illustrating the theoretical background involved.

Figure 1:
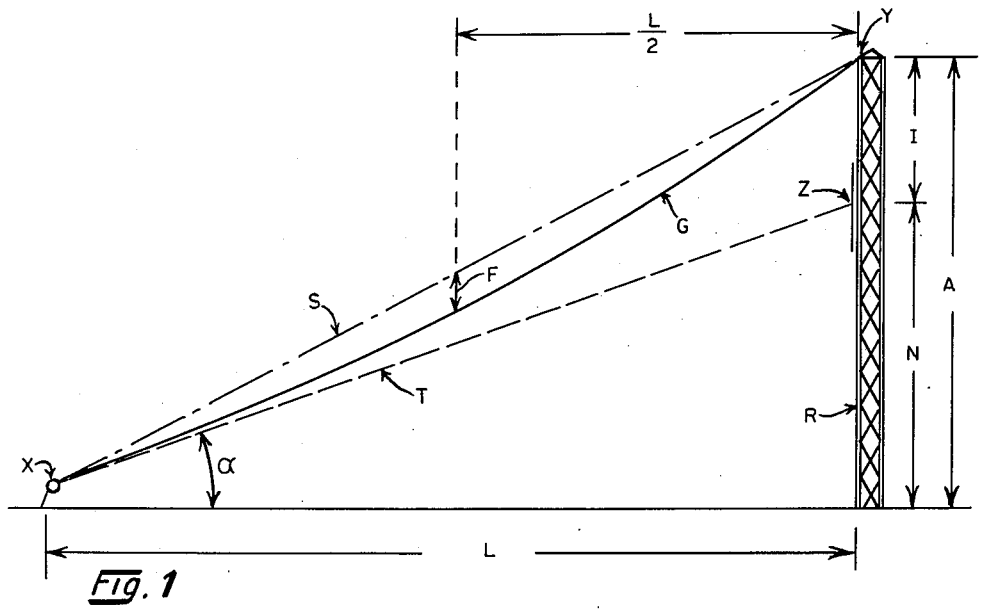

In FIGURE 1, there is shown a diagram representing a guy wire attached to a fixed ground foundation at point X and to a tower R at a fixed point Y. The horizontal distance from point X to the base of the tower is indicated by L and half this distance by L/2. The guy wire is indicated at G and the line indicating the tangent line to the curve of G at point X is shown at T. The point at which the tangent line should intercept the tower R is indicated at Z and the vertical distance of point Z below point Y is indicated by I. The difference in vertical elevation between points X and Y is indicated by A. The difference between A and I is indicated by N. By reference to a straight line S drawn from X to Y, the median vertical sag of the guy wire at the L/2 distance is indicated by the vertical distance F, the vertical angle of the tangent intercept line being indicated by the symbol alpha. Since the background theory to be explained holds generally true for either a tower situation as represented in FIG. 1, or a transmission line situation as represented in FIGURE 2, the same system of labelling, where applicable, is used in both figures.

Referring particularly to FIG. 1, based on fundamental equations and standard strength of materials nomenclature, it can be shown that the distance I, referred to as the vertical intercept, is, within allowable tolerances, four times the sag F. Thus, by locating I, it is possible to determine F. Knowing F, it can be further shown that tension can be computed by the equation $$H = \frac{WL^2}{8F} \text{ or } H = \frac{WL^2}{2I}$$

where H is the tension in the guy wire G in pounds, W is the weight in pounds per foot, projected horizontally, of the guy wire G, L is the horizontal distance in feet between the points X and Y, F is the sag in feet and I is the vertical intercept measured in feet. Thus, once the desired distance between points Y and Z represented by I is correctly established, and the correct location of Z is determined, it is possible, by sighting along the tangent intercept line T to determine whether the point of interception is or is not at Z. If it is, the guy wire is known to be in correct tension; if not, the guy wire is known to be incorrectly tensioned. It can be seen that the aforesaid then constitutes a distinct way of establishing, determining and checking guy wire tension.

Again referring particularly to FIG. 1, it can also be shown that within allowable tolerances, the vertical angle alpha is related to the tension through the following equations:

$$\text{Tangent alpha} = \frac{N}{L} = \frac{A}{L} - \frac{WL}{2H}$$

In the equations, A and L are in feet, W is the weight in pounds per foot, projected horizontally, of the guy wire G and H is the tension in the buy wire G in pounds. From this it is seen that the correct tension is related to a vertical angle that can be computed and that is measurable in the field at the site of the tower. Measurement of the vertical angle of the tangent intercept line thus constitutes another distinct way of establishing, determining and checking guy wire tension.

It may be noted that ambient temperature affects contraction and expansion of the guy wire and related supported structures. Note is also made of the fact that in a practical situation point X is usually inaccessible as an operating location for taking sights and measuring angles. Any method or apparatus making use of the mentioned theory should, therefore, be able to accommodate to such temperature changes and be adaptable to operating locations other than at the most optimum points.

In the embodiment of the invention now to be described in further detail, advantage of the foregoing theory is taken by providing an apparatus which can be clamped to a relatively short, substantially straight section of the guy wire G ahead, but relatively close to what has been referred to as point X and that includes a precision sighting instrument whose optical axis is accurately focused substantially along what has been referred to as the tangent intercept line T so as to locate the tangent intercept point. During clamping of the apparatus, the optical axis of the instrument is automatically aligned in parallel and adjacent relation with the axis of the referred to short section of guy wire, which axis, because of its length, is effectively a straight line and, within very small error, the optical axis of the sighting instrument is made to coincide with the tangent intercept line T. The apparatus also includes precision means to measure accurately the referred to vertical angle alpha. In the method of the invention, the tower R or the post P, in FIG. 2, is used to support an accurately placed target representing point Z, as corrected to prevailing ambient temperature and location of the apparatus on the guy wire, making it possible to locate accurately the tangent intercept point and measure the angle alpha simultaneously.

Referring now particularly to FIGS. 3 through 6 inclusive, 10 and 11 indicate a pair of similarly shaped rectangular plate frame members, each of which has one end bifurcated into a precision machined V-shape adapted to be secured to various size guy wire sections indicated in dotted lines at 12. Members 10 and 11 are each joined to a central rectangular shaped plate frame member 13 located between and lying perpendicular to members 10 and 11 as indicated in the drawings. Attached at one end to frame member 13 is an additional somewhat U-shaped frame member 14 arranged to straddle guy wire section 12. Member 14 is provided at one end with internal threads, not shown, so as to accommodate a tightening screw 15 equipped with a clamping head 16 and a tightening pin 17. While not shown in detail, it is preferable that the connection between screw 15 and head 16 be any of the well known forms which will allow screw 15 to rotate or slip with respect to head 16, particularly during final tightening. Also making up part of the basic frame of the apparatus is a substantially circular plate frame member 18 having extending portions as indicated at 19 and 20 joined in perpendicular relation to members 10 and 11 respectively. Members 10, 11, 13, 14 and 18 constitute the basic frame of the apparatus and may be cast in metal as an integral unit and precision machined to size. For purposes of facilitating manufacture, however, it has been found advisable to cast members 10, 11 and 13 as an integral unit and attach members 14 and 18 in the relative positions indicated. The metal or alloy used should preferably be one that is easily machined, is relatively light in weight and has no tendency to warp.

Members 10 and 11 are each suitably precision bored so as to accommodate a sighting telescope 21 having an adjustable eye-piece represented at 22 and a viewing head indicated at 23. Telescope 21 is of the internal focusing type and is provided with an external focusing knob 24 and with cross hairs, not shown, in eye-piece 22. The telescope also includes means to adjust the eye-piece, cross hairs and optical axis, as represented by adjusting screws 25. A telescope magnification of at least 16 power is desired in order that towers in the range of 1500 feet high may be accommodated by the apparatus. A telescope meeting each of these requirements is the Bostrum No. 5 convertible level 16 power telescope manufactured by Bostrum-Brady Manufacturing Company of 526 Stonewall Street, Atlanta, Georgia.

In locating telescope 21 in members 10 and 11, care should be taken to precisely align the optical axis of the telescope with the V-shaped ends of members 10 and 11 so that when guy wire 12 is clamped between clamping head 16 and the V-shaped ends of members 10 and 11, the longitudinal axis of the guy wire section 12 lying between the V-shaped ends will lie precisely parallel with the optical axis of the telescope 21. While some variation can be corrected in the field by means of the optical axis adjusting screws 25, the initial boring of members 10 and 11 to accommodate telescope 21 and initial machining of the V-shaped ends should be done as accurately as possible to effect the mentioned parallel alignment of the optical axis with the longitudinal axis of the guy wire section. It may be noted here that the spacing between the V-shaped ends of members 10 and 11 is in the order of four inches so that, in effect, the optical axis of the telescope 21 is being made parallel with the longitudinal axis of a four inch long substantially straight section of the guy wire. The longitudinal axis of the guy wire section, being a very small and substantially straight increment of length in a relatively long, curved length of guy wire that might extend well over a thousand feet, effectively coincides with the line that is tangent to the curve of the guy wire at the point at which the apparatus is clamped to the guy wire. Thus, with insignificant error, the optical axis of the telescope is, in effect, sighted along the tangent intercept line T previously referred to in FIG. 1. While the apparatus described is normally used with the telescope 21 lying either to the right or left of the guy wire, the telescope is equally effective in any of the several angular positions which the frame is free to assume.

In the detail description thus far, reference has been made to that part of the apparatus devoted to sighting along the tangent intercept line, this being an independent tension measuring system in itself. Reference is next made to the means used to measure the vertical angle of the tangent intercept line, this also being an independent tension measuring system. As mentioned before, both of these systems, however, are actually employed in a single measuring structure.

Referring particularly to FIGS. 4 and 6, the vertical angle measuring means comprises a flat, circular degree-calibrated disc 26 inset into the central milled out portion 18' of member 18. Disc 26 is rotatable, in effect, around its own axis which is made perpendicular to the axis of guy wire section 12. In FIG. 6, an enlarged partial cross-section taken along line 6—6 of FIG. 4 illustrates the method of mounting disc 26. Snugly fitted within member 18 is a nylon bushing 27 providing a bearing surface for a pin 28 fitted with a thin nylon washer 29. In assembly, pin 28 is fitted with washer 29 and is passed through disc 26, through bushing 27 and through a locking collar 30 having a set screw 31. The assembly is of sufficient tightness to allow pin 28, washer 29, collar 30 and disc 26 to rotate as a unit, bushing 27 remaining stationary. The assembly of the disc components should preferably be in such manner as will allow the disc to be rotated to any desired position while at the same time resisting any tendency of the disc to move, once set in a desired position. Disc 26 is accurately calibrated in degrees, minutes and seconds and in ninety degree quadrants and, in order to provide precise readings, is provided with a suitably calibrated vernier 32, inset into the extended portion of member 18.

In manufacture, member 18 and disc 26 are accurately arranged in perpendicular relation to members 10 and 11 and in parallel relation with the optical axis of telescope 21. In order that disc 26 may be placed in a true vertical position, there is affixed to member 10 a level 33 attached by means of a bracket 34 having adjustable lock nuts 35. The location of level 33 should be such that it indicates level only when disc 26 is vertical which, in effect, means that the axis about which disc 26 rotates must be horizontal. Level 33 is of the invertible type that can be read from two sides, therefore level can be ascertained with disc 26 either to the right or left of guy wire 12. For the purpose of making the zero-zero line on disc 26 horizontal, disc 26 is also provided with a similar two-sided invertible level 36 mounted on a bracket 37 attached to disc 26 and having field adjustable locknuts 38, the level 36 and disc 26 rotating as a unit. As will be later seen, with the apparatus properly clamped in position, the vertical angle of the tangent intercept line is obtained by leveling level 33, then leveling level 36 and then reading the degree reading on the matching graduations of vernier 32 and disc 26.

As previously mentioned, it is generally inpractical to locate the apparatus at what is effectively point X of FIG. 1. In FIG. 7, is shown diagrammatically a typical guy wire foundation arrangement which generally includes a pair of plates 39, 40 anchored in a concrete base, not shown, supporting an anchor pin 41 around which is passed a U-bolt 42. U-bolt 42 passes through a lug 43 embedded by the cable manufacturer on the end of guy wire 12. The U-bolt is provided with adjusting nuts 44 such that the tension in guy wire 12 may be regulated. When the apparatus of the invention is used, an arbitrary point K is located and marked on guy wire 12 immediately ahead of U-bolt 42 and note is made of the distance E. The V-shaped ends of members 10 and 11 are then clamped to guy wire 12 such that point K lies equidistant between the ends and appropriate correction is made for the fact that the tangent is being taken and the vertical angle is being measured at point K rather than at the point X, namely at pin 41. As a practical matter, since the cable as it approaches the anchor is an almost exact straight line, very little error is introduced so long as the apparatus is located at any place along this relatively straight portion of the guy wire 12.

Reference is next made to schematic FIG. 8 which schematically represents a section of the tower leg 45 located in the vicinity of what has been referred to in FIG. 1 as the tangent intercept point Z. On this section is a vertically graduated target 46, having a bulls eye 47 accurately located at a point equivalent to tangent intercept point Z at an arbitrary standard reference temperature of seventy degrees Fahrenheit and as further corrected for distance E. Above and below bulls eye 47 is a series of graduations representing where tangent intercept point Z should be located at temperatures above and below seventy degrees Fahrenheit, corrected where necessary for distance E.

The described target should be sufficiently small to avoid adding wind load to the tower but it should be of sufficient size to be optically visible, that is, of sufficient size to be seen through telescope 21, aided by a target lamp, if desired.

Figure 9:
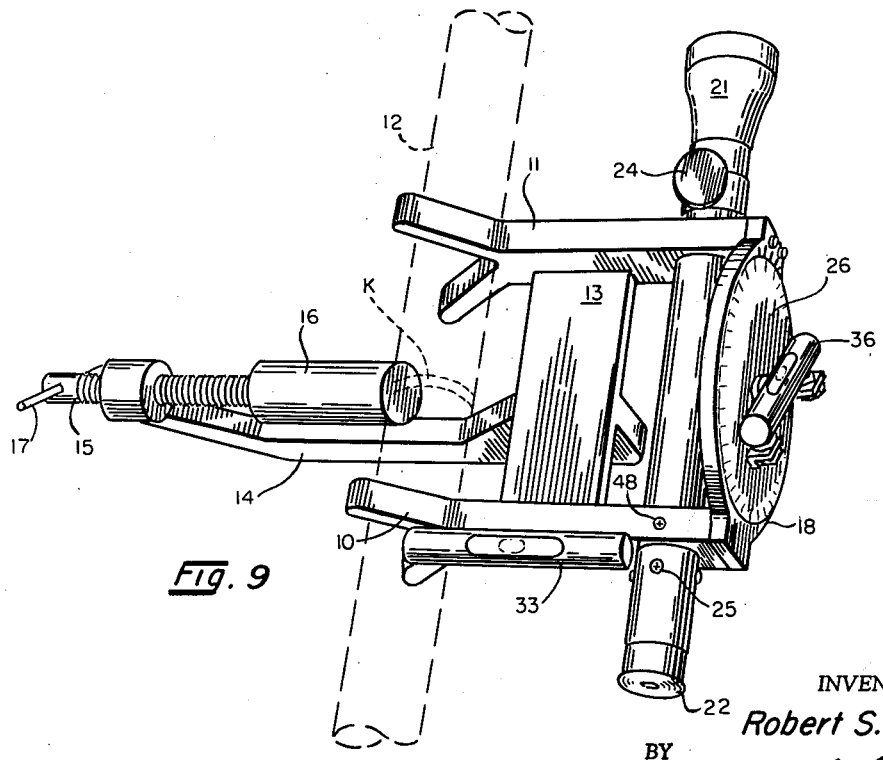
FIGURE 9 is a perspective view of the apparatus in position on the guy wire, indicated in dotted lines.

In FIG. 9, a perspective view of the apparatus is taken showing the apparatus as it appears located on a section of guy wire. To use the apparatus, it is first loosely clamped in position to one side of the guy wire and adjusted until level 33 indicates a level reading, at which point the clamping head 16 is firmly tightened against the guy wire. Level 36 is next adjusted until it indicates level. A reading is then taken through telescope 21 of where the cross hairs of eyepiece 22 fall on target 46. If the temperature happens to be exactly seventy degrees Fahrenheit at the time and the apparatus is located at point K, the cross hairs should fall exactly on the bulls eye 47. Otherwise, they should fall on the graduation above or below bulls eye 47 which corresponds to the actual ambient temperature corrected, where necessary, for the distance E described in FIG. 7. At the same time, a reading is taken of the vertical angle indicated by disc 26 and vernier 32, with level 36 level, after which an additional reading of the vertical angle is taken with level 36 made level in inverted position, the average being taken as the true vertical angle so as to minimize error. The apparatus is next rotated around the guy wire section so as to reside on the opposite side of the guy wire and level 33, level 36 and clamping head 16 are again adjusted as before. A reading of the tangent intercept point is again taken through telescope 21 and two readings of the vertical angle of the tangent intercept line are again taken with level 36, first in one position and then in an inverted position, the average vertical angle reading being taken as correct.

By averaging the sets of telescope and vertical angle readings described above, very accurate measurements indicating the existing guy wire tension by the tangent intercept method and, independently, by the vertical angle method are made available. By comparing the tension as computed from each of these measurements, the correct existing tension or an error in one or both of the methods or apparatus will be indicated. Assuming the measurements taken by the two separate methods indicate the same existing guy wire tension, its correctness may reasonably be assumed and, by now comparing the measured tension with the design tension, an immediate indication is given of any dangerous tension situation. In actual practice, the correct location of the tangent intercept point Z at a given temperature and with the apparatus at a given distance E from the base point X may be reduced to a table of figures which may be quickly referred to in the field in connection with the particular guy tension in question. Similarly, the vertical angle alpha of the tangent intercept line may also be indicated in prepared tables of angles so that the correct vertical angle for any given condition may be readily ascertained. With the necessary information previously prepared and available at the site and with point K and target 46 located, all that the operator is required to do in order to check guy wire tension is to locate and loosely clamp the apparatus on the guy wire, adjust level 33 making the disc vertical, firmly clamp the apparatus, adjust the disc level 36 and then take readings, followed, if desired, by a set of readings taken on the opposite side of the guy wire. After a storm and the like, such a set of measurements may be quickly taken and the stability of the tower noted immediately for possible corrective action. In emergencies, a reasonably certain indication of faulty tension may be noted even in dark or fog situations by relying solely on the vertical angle system. Since a guyed tower is one of the few types of structure in which small changes in geometry may cause stresses or displacements to be amplified, the invention offers, for both normal and emergency use, a particular advantage in providing a quick and simple means for detecting such changes as brought about by change in guy wire tension.

One of the important practical advantages of the invention lies in the fact that the accuracy of the apparatus itself may be checked and adjusted in the field. For example, the parallel relation of the optical axis with the guy wire axis may be checked by noting where the cross hairs fall on the tower when the apparatus is first on one side and then on the other side of the guy wire. Assuming the cross hairs indicate the optical axis is out of parallel, any normal correction that might be required may be made by slightly rotating telescope 21 with respect to members 10, 11 and by adjusting the eyepiece adjusting screws 25. After such adjustments, the telescope 21 may be fixed from rotation by means of set screw 48 (FIG. 9). In the same sense, the accuracy of the levels with respect to each other and with respect to the disc and frame of the apparatus may be checked by taking direct and inverted readings of the levels and by referring the apparatus levels to a reference level that may be easily established in the field. Any ordinary corrections that are needed may then be made by adjusting the adjusting lock nuts on the levels.

For those familiar particularly with prior broadcasting tower tensioning apparatus and methods, another important advantage will be seen in that the apparatus and method of this invention makes it practical, particularly during erection, to install tension measuring apparatus on each of several guy wires and, by means of radio ground control, to draw all of such guy wires into proper tension at the same time. Many of these same advantages may also be realized when applying the invention to other guyed structures such as stacks, ski-lifts, bridges and the like.

Having described my invention, what I claim is:

1. The method of establishing a predetermined tension in a relatively long curved flexible strand having a ground anchor and an elevated connection to a tower comprising the steps of accurately fixing an optically visible target on said tower below said connection a distance proportional to the median vertical sag of said strand at said tension, then optically sighting from a location near said ground anchor towards said target along an axis immediately adjacent and parallel to the axis of a relatively short substantially straight section of said strand, then adjusting said strand until said tension is achieved as indicated by the sighting of said target.

2. The method of establishing a predetermined tension in a relatively long flexible strand strung between and curved below a straight line joining first and second points of support for said strand, comprising the steps of accurately fixing an optically visible target vertically below said second point a distance proportional to the median vertical sag of said strand at said tension, then optically sighting from said first point toward said target along an axis parallel to and immediately adjacent a relatively short substantially straight section of said strand at said first point, then adjusting said strand until the projection of said optical axis strikes said target.

3. A cross comparison method of establishing a predetermined tension in a relatively long flexible strand strung between and curved below a straight line joining first and second points of support for said strand, comprising the steps of accurately fixing an optically visible target a predetermined distance vertically below said second point, then attaching at said first point vertical angle measuring means preset at a vertical angle obtained at said tension, then sighting from said first point along a line of vision intended to strike said target at said tension, then adjusting said tension while comparing the obtaining of said angle with the observation of said target.

References Cited in the file of this patent

UNITED STATES PATENTS

| | | |
|---|---|---|
| 420,245 | Rose | Jan. 28, 1890 |
| 1,927,178 | Lemaire | Sept. 19, 1933 |
| 2,564,461 | Bowers | Aug. 14, 1951 |
| 2,900,159 | Mattox | Aug. 18, 1959 |

FOREIGN PATENTS

| | | |
|---|---|---|
| 41,911 | Norway | Sept. 21, 1925 |
| 260,664 | Italy | Oct. 8, 1928 |
| 534,245 | Germany | Sept. 10, 1931 |